United States Patent
Rajagopalan et al.

(10) Patent No.: US 8,026,304 B2
(45) Date of Patent: Sep. 27, 2011

(54) PARTIALLY OR FULLY NEUTRALIZED BUTYL IONOMERS IN GOLF BALL LAYERS

(75) Inventors: Murali Rajagopalan, South Dartmouth, MA (US); Derek A. Ladd, Acushnet, MA (US); Douglas E. Jones, Dartmouth, MA (US); Edmund A. Hebert, Mattapoisett, MA (US); Michael J. Sullivan, Barrington, RI (US); Kevin M. Harris, New Bedford, MA (US)

(73) Assignee: Acushnet Company, Fairhaven, MA (US)

( * ) Notice: Subject to any disclaimer, the term of this patent is extended or adjusted under 35 U.S.C. 154(b) by 504 days.

(21) Appl. No.: 12/172,312

(22) Filed: Jul. 14, 2008

(65) Prior Publication Data

US 2010/0009778 A1    Jan. 14, 2010

(51) Int. Cl.
  *A63B 37/00* (2006.01)
  *A63B 31/12* (2006.01)
  *C08F 210/12* (2006.01)
  *C08F 8/20* (2006.01)

(52) U.S. Cl. ............ 524/322; 524/394; 525/332.3; 525/332.8; 525/340; 525/379; 473/371

(58) Field of Classification Search ............ None
See application file for complete search history.

(56) References Cited

U.S. PATENT DOCUMENTS

| | | | |
|---|---|---|---|
| 5,779,562 A * | 7/1998 | Melvin et al. | 473/373 |
| 6,245,862 B1 * | 6/2001 | Rajagopalan | 525/340 |
| 6,552,108 B1 | 4/2003 | Wang et al. | |
| 6,664,319 B1 | 12/2003 | Bahl et al. | |
| 6,994,638 B2 | 2/2006 | Rajagopalan et al. | |
| 7,230,045 B2 | 6/2007 | Rajagopalan et al. | |
| 7,357,735 B2 | 4/2008 | Sullivan et al. | |
| 7,358,320 B2 | 4/2008 | Rajagopalan et al. | |
| 2001/0005699 A1 * | 6/2001 | Morgan et al. | 473/376 |
| 2005/0227786 A1 * | 10/2005 | Sullivan et al. | 473/371 |
| 2007/0218296 A1 | 9/2007 | Resendes et al. | |

FOREIGN PATENT DOCUMENTS

WO   WO-2007-022619   *   3/2007

* cited by examiner

*Primary Examiner* — David Buttner
(74) *Attorney, Agent, or Firm* — D. Michael Burns

(57) ABSTRACT

A golf ball having a core, and at least one layer about the core, wherein the core or the layer is formed from partially or fully neutralized butyl ionomers or their blends to improve the resiliency and impact durability over a conventional butyl rubber. The core comprises a thermoplastic material, a thermoset material, or a rubber-based material, while at least one layer is formed from a composition comprising a partially or fully neutralized butyl rubber ionomer. The butyl rubber ionomer comprises repeating units derived from at least one isoolefin monomer, at least 0.5 mol % of repeating units derived from at least one multiolefin monomer, at least 0.5 mol % of repeating units derived from an allylic halide, and at least 0.5 mol % of an ionomeric moiety. The isoolefin comprises isobutylene, the multiolefin comprises isoprene and the allylic halide comprises a bromide.

10 Claims, No Drawings

PARTIALLY OR FULLY NEUTRALIZED BUTYL IONOMERS IN GOLF BALL LAYERS

FIELD OF THE INVENTION

The invention relates to partially or fully neutralized butyl ionomers or their blends in golf ball components to improve the resiliency and impact durability over a conventional butyl rubber.

BACKGROUND

Conventional golf balls can be divided into two general classes: solid and wound. Solid golf balls include one-piece, two-piece (i.e., solid core and a cover), and multi-layer (i.e., solid core of one or more layers and/or a cover of one or more layers) golf balls. Wound golf balls typically include a solid, hollow, or fluid-filled center, surrounded by a tensioned elastomeric material, and a cover. It is also possible to surround a hollow or fluid-filled center with a plurality of solid layers. Solid balls have traditionally been considered longer and more durable than wound balls, but many solid constructions lack the "feel" provided by the wound construction.

More recently, by altering ball construction and composition, manufacturers have been able to vary a wide range of playing characteristics, such as compression, velocity, "feel," and spin, optimizing each or all be optimized for various playing abilities. In particular, a variety of core and cover layer(s) constructions, such as multi-layer balls having dual cover layers and/or dual core layers, have been investigated and now allow many non-wound balls to exhibit characteristics previously unattainable in a solid-construction golf ball. These golf ball layers are typically constructed with a number of polymeric compositions and blends, including polybutadiene rubber, polyurethanes, polyamides, and ethylene-based ionomers.

It is well known in the golf ball art as well as in the polymer and rubber science that conventional butyl rubber is typically an energy absorbing material, hence its vast use in applications such as a shock absorbing medium, this characteristic reduces the resiliency of the golf ball as in the case of developing a low flight golf ball. The use of butyl rubber in golf balls has not been fully explored since it's been found that even a small amount of butyl rubber will significantly reduce the golf ball resiliency and performance. There is a need in the golf ball industry to find a way to overcome this deficiency. The present invention introduces a new ball construction and attacks the above deficiency by forming golf ball layers with partially or fully neutralized butyl ionomers which are developed by carrying out a halogenation process to produce a halobutyl polymer followed by a nucleophilic reaction with the allylic halide functionality to produce an ionomer moiety. This is further described in U.S. Patent Publication 2007/0218296.

SUMMARY OF THE INVENTION

The present invention provides for the forming of a golf ball having a core and at least one layer about the core. The layer can be a core layer, a cover, or a cover comprising of an inner and outer layer. The core comprises of either a thermoplastic material, a thermoset material, or a rubber-based material, while at least one layer is formed from a composition comprising a partially or fully neutralized butyl rubber ionomer. The butyl rubber ionomer comprises repeating units derived from at least one isoolefin monomer, at least 0.5 mol % of repeating units derived from at least one multiolefin monomer, at least 0.5 mol % of repeating units derived from an allylic halide, and at least 0.5 mol % of an ionomeric moiety. The isoolefin comprises isobutylene, the multiolefin comprises isoprene and the allylic halide comprises a bromide.

In one embodiment, the golf ball of the present invention provides for a butyl rubber ionomer, comprising allylic halide moieties to bring about a partial neutralization (about 70% or less), and this can also be reacted with a suitable nucleophilic agent in the presence of a sufficient amount of an organic fatty acid salt, to bring the neutralization to 100%, wherein the organic fatty acid salt is selected from a group consisting of butyric acid, caproic acid, caprylic acid, capric acid, lauric acid, myristic acid, palmitic acid, margaric acid, stearic acid, arachidic acid, behenic acid, lignoceric acid, palmitoleic acid, petroselinic acid, oleic acid, elaidic acid, cis-vaccenic acid, trans-vaccenic acid, gadoleic acid, gondoic acid, erucic acid, nervonic acid, linoleic acid, .gamma.-linolenic acid, .alpha.-linolenic acid, stearidonic acid, dihomo-.gamma.-linolenic acid, arachidonic acid, timnodonic acid, clupandonic acid, dimers, trimers and mixtures thereof.

In another embodiment of the present, the butyl ionomer is produced by introducing an acid moiety in the butyl polymer either by carboxylation or sulfonation process by skilled in the art and followed by neutralizing of the acid in the polymer in the presence of a sufficient amount of a suitable inorganic metal cation source. Optionally, a sufficient amount of a suitable salt of fatty acid is used to produce highly neutralized butyl ionomers. The inorganic metal cation selected from a group consisting of barium, lithium, sodium, zinc, bismuth, chromium, cobalt, copper, potassium, strontium, titanium, tungsten, magnesium, cesium, iron, nickel, silver, aluminum, tin, calcium, manganese and mixtures thereof.

Another embodiment of the invention provides for a golf ball with a core having a Shore C surface hardness of less than about 90 and a compression of less than 90, and a diameter of 1.45 to 1.55 inches, and encasing the core with a cover layer having a thickness of 0.01 inches to 0.05 inches and a Shore D hardness of 40 to 65. While the core may be formed from a thermoplastic material, a thermoset material, or a rubber-based material, the cover layer can be formed from a blend of the butyl ionomer with polyurethane or polyurea.

The present invention provides for a method of increasing the resiliency and impact durability of golf balls made with partially or fully neutralized butyl ionomers.

Further features of the invention will be described in the following detailed description.

DETAILED DESCRIPTION OF PREFERRED EMBODIMENTS

The golf balls of the present invention may comprise any of a variety of constructions, from a simple one-piece solid ball, to a two-piece ball formed of a core and cover, to a three piece formed of a core that comprises a center and a layer, and encased with a cover, to any multi-piece construction having at least a core, (center and core layer), and a cover formed of an inner cover layer and an outer cover layer. The core and/or the cover layers may be formed of more than one layer. The innermost portion of the core, while preferably solid, may be a hollow or a liquid filled. As with the core, the cover may also comprise a plurality of layers, at least one of which may be an adhesive or coupling layer. The layers may be continuous or non-continuous (i.e., grid-like). The core may also comprise a solid or liquid filled center around which many yards of a tensioned elastomeric material are wound.

It is well known in the polymer and rubber science art that a conventional butyl rubber does not have resilient qualities. Hence it is often used as a shock absorber or to reduce the resiliency of the golf ball. As a result of this, even a small amount of butyl rubber in a golf ball will significantly reduce the golf ball resiliency and performance. The present invention describes a means of overcoming this deficiency by introducing ionic moiety through a halogenation process to produce a halobutyl polymer followed by a nucleophilic reaction with an allylic halide functionality to produce an ionomer moiety. The ionomers used herein are partially or fully neutralized. In yet another embodiment of the invention, the acid content in the butyl polymer might be from 5 to 30 wt %; the acid type might be carboxylic or sulfonic or phosphoric acid type; the neutralization level might be 10 to 100%; and the cation type may be monovalent, divalent, or trivalent from the like of Li+, Na+, K+, Mg++, Zn++, Al+++, etc.

Any of the core layers, or cover components may be formed of or include either partially or fully neutralized butyl ionomers or their blends to improve resiliency and impact durability over a conventional butyl rubber. A butyl rubber ionomer is prepared from a halogenated butyl rubber polymer. Butyl rubber polymers comprise repeating units derived from at least one isoolefin monomer; at least 0.5 mol % of repeating units derived from at least one multiolefin monomer; at least 0.5 mol % of repeating units derived from an allylic halide;and at least 0.5 mol % of an ionomeric moiety, wherein the isoolefin comprises isobutylene, the multiolefin comprises isoprene and the allylic halide comprises a bromide.

In the present invention, butyl ionomers can be either as is or can be blended with other thermoplastic materials like ionomers, highly neutralized polymers such as HPF® from DuPont, engineering thermoplastic materials like polyester/polycarbonate, polyamide, polyester, thermoplastic urethanes, as well as thermoplastic elastomers such as poly(ether or ester-amide or ester) as manufactured by DuPont under the trade name Hytrel®, or Arkema under the trade name Pebax®.

Suitable flow modifiers like fatty acid salts or non-fatty acid salts can be incorporated in the polymer compositions in order to achieve higher neutralization levels such as 70 to 100 weight percent.

Fatty acids are organic compounds containing 4 to 24 carbon atoms, having a hydrocarbon chain and a terminal carboxylic acid group. The hydrocarbon chain may be saturated, mono-unsaturated or monoenoic, and polyunsaturated or polyenoic. Dimers and trimers of the fatty acids can also be used in this embodiment of this invention.

Examples of saturated fatty acids are butyric (butanoic) acid, caproic (hexanoic) acid, caprylic (octanoic) acid, capric (decanoic) acid, lauric (dodecanoic) acid, myristic (tetradecanoic) acid, palmitic (hexadecanoic) acid, margaric (heptadecanoic) acid, stearic (octadecanoic) acid, arachidic (icosanoic) acid, behenic (docosanoic) acid, and lignoceric (tetracosanoic) acid.

Examples of monounsaturated fatty acids, or monoenoic fatty acids, are palmitoleic (cis-hexadec-9-enoic) acid, petroselinic (cis-octadec-6-enoic) acid, oleic (cis-octadec-9-enoic) acid, elaidic (trans-octadec-9-enoic) acid, cis-vaccenic (cis -octadec-11-enoic) acid, trans-vaccenic (trans-octadec-11-enoic) acid, gadoleic (cis-icos-9-enoic) acid, gondoic (cis-icos-11-enoic) acid, erucic (cis-docos-13-enoic) acid, and nervonic (cis-tetracos-15-enoic acid).

Examples of polyunsaturated fatty acids, or polyenoic fatty acids, are linoleic (cis,cis-octadeca-9,12-dienoi) acid, .gamma.-linolenic (all-cis-octadeca-6,9,12-trienoic) acid, .alpha.-linolenic (all-cis-octadeca-9,12,15-trienoic) acid, stearidonic (all-cis -octadeca-6,9,12,15-tetraenoic) acid, dihomo-.gamma..-linolenic (all-cis-icosa-8,11,14-trienoic) acid, arachidonic (all-cis-icosa-5,8,11,14-tetraenoic) acid, timnodonic (all-cis-icosa-5,8,11,14,17-pentaenoic) acid, and clupandonic (all-cis-docosa-4,7,10,13,16,19-hexaenoic) acid.

In one embodiment of the invention, the fatty acids are caprylic acid, capric acid, stearic acid, and oleic acid, and their dimers, trimers and mixtures thereof. In another embodiment of the invention, the fatty acids are oleic acid, and its dimer, trimer and mixtures thereof.

For the present invention, a preferred use of materials for the inner or outer covers are blends with polyurethanes, polyurethane-ureas, polyurea-urethanes, polyureas, polyurethane-ionomers, epoxies, silicones, and unsaturated polyesters as inner or outer cover materials. These layers may be formed in a variety of methods, however preferably they are applied (i.e., sprayed, dipped, etc.) or molded using reaction injection molding, casting, laminating, or otherwise forming a thermoplastic or preferably thermoset layer of polymer from liquid reactive components. These materials may also be blended with thermoplastic composites wherein the thermoplastic materials comprise ionomers, polyurethanes, polyurethane-ureas, polyurea-urethanes, polyureas, metallocenes (including grafted metallocenes), polyamides, PEBAX®, HYTREL®, and other suitable materials, such as those described in U.S. Pat. Nos. 6,149,535 and 6,152,834, which are incorporated herein, in their entirety, by express reference thereto.

Suitable polyurethane-type materials for blending with the butyl rubber material of the present invention by which any cover layer, preferably outer cover layers may be formed if not blended with the hybrid materials include, but are not limited to, polyurethanes, polyurethane-ureas, polyurea-urethanes, polyureas, or epoxies, that generally comprise the reaction product of at least one polyisocyanate, polyol, and at least one curing agent. Any polyisocyanate available to one of ordinary skill in the art is suitable for use according to the invention. Exemplary polyisocyanates include, but are not limited to, 4,4'-diphenylmethane diisocyanate ("MDI"); polymeric MDI; carbodiimide-modified liquid MDI; 4,4'-dicyclohexylmethane diisocyanate ("H.sub.12MDI"); p-phenylene diisocyanate ("PPDI"); m-phenylene diisocyanate ("MPDI"); toluene diisocyanate ("TDI"); 3,3'-dimethyl-4,4'-biphenylene diisocyanate ("TODI"); isophoronediisocyanate ("IPDI"); hexamethylene diisocyanate ("HDI"); naphthalene diisocyanate ("NDI"); xylene diisocyanate ("XDI"); p-tetramethylxylene diisocyanate ("p-TMXDI"); m-tetramethylxylene diisocyanate ("m-TMXDI"); ethylene diisocyanate; propylene-1,2-diisocyanate; tetramethylene-1,4-diisocyanate; cyclohexyl diisocyanate; 1,6-hexamethylene-diisocyanate; dodecane-1,12-diisocyanate; cyclobutane-1,3-diisocyanate; cyclohexane-1,3-diisocyanate; cyclohexane-1,4-diisocyanate; 1-isocyanato-3,3,5-trimethyl-5-isocyanatomethylcyclohexane; methyl cyclohexylene diisocyanate; triisocyanate of HDI; triisocyanate of 2,4,4-trimethyl-1,6-hexane diisocyanate ("TMDI"); tetracene diisocyanate; napthalene diisocyanate; anthracene diisocyanate; isocyanurate of toluene diisocyanate; uretdione of hexamethylene diisocyanate; and mixtures thereof. Preferably, the polyisocyanate includes MDI, PPDI, TDI, or a mixture thereof. It should be understood that, as used herein, the term "MDI" includes 4,4'-diphenylmethane diisocyanate, polymeric MDI, carbodiimide-modified liquid MDI, and mixtures thereof and, additionally, that the diisocyanate employed may be "low free monomer," understood by one of ordinary skill in the art to have lower levels of "free" monomer isocyanate groups, typically less than about 0.1% free monomer groups. Examples of "low free monomer" diisocyanates include, but are not limited to Low Free Monomer MDI, Low Free Monomer TDI, and Low Free Monomer PPDI.

The polyisocyanate should have less than about 14% unreacted NCO groups. Preferably, the at least one polyisocyanate has no greater than about 7.5% NCO, and more preferably, less than about 7.0%. It is well understood in the art that the hardness of polyurethane can be correlated to the percent of unreacted NCO groups.

Any polyol available to one of ordinary skill in the art is suitable for use according to the invention. Exemplary polyols include, but are not limited to, polyether polyols, hydroxy-terminated polybutadiene (includes partially/fully hydrogenated derivatives), polyester polyols, polycaprolactone polyols, and polycarbonate polyols. In one preferred embodiment, the polyol includes a polyether polyol, such as polytetramethylene ether glycol ("PTMEG"), polyethylene propylene glycol, polyoxypropylene glycol, and mixtures thereof. The hydrocarbon chain can have saturated or unsaturated bonds and substituted or unsubstituted aromatic and cyclic groups. Preferably, the polyol of the present invention includes PTMEG.

Suitable polyester polyols include, but are not limited to, polyethylene adipate glycol; polybutylene adipate glycol; polyethylene propylene adipate glycol; o-phthalate-1,6-hexanediol; poly(hexamethylene adipate) glycol; and mixtures thereof. The hydrocarbon chain can have saturated or unsaturated bonds, or substituted or unsubstituted aromatic and cyclic groups. Suitable polycaprolactone polyols include, but are not limited to, 1,6-hexanediol-initiated polycaprolactone, diethylene glycol initiated polycaprolactone, trimethylol propane initiated polycaprolactone, neopentyl glycol initiated polycaprolactone, 1,4-butanediol-initiated polycaprolactone, PTMEG-initiated polycaprolactone, and mixtures thereof. The hydrocarbon chain can have saturated or unsaturated bonds, or substituted or unsubstituted aromatic and cyclic groups.

Suitable polycarbonates include, but are not limited to, polyphthalate carbonate and poly(hexamethylene carbonate) glycol. The hydrocarbon chain can have saturated or unsaturated bonds, or substituted or unsubstituted aromatic and cyclic groups.

Polyamine curatives are also suitable for use in polyurethane covers. Preferred polyamine curatives include, but are not limited to, 3,5-dimethylthio-2,4-toluenediamine and isomers thereof; 3,5-diethyltoluene-2,4-diamine and isomers thereof, such as 3,5-diethyltoluene-2,6-diamine; 4,4'-bis-(sec-butylamino)-diphenylmethane; 1,4-bis-(sec-butylamino)-benzene, 4,4'-methylene-bis-(2-chloroaniline); 4,4'-methylene-bis-(3-chloro-2,6-diethylaniline) ("MCDEA"); polytetramethyleneoxide-di-p-aminobenzoate; N,N'-dialkyldiamino diphenyl methane; p,p'-methylene dianiline ("MDA"); m-phenylenediamine ("MPDA"); 4,4'-methylene-bis-(2-chloroaniline) ("MOCA"); 4,4'-methylene-bis-(2,6-diethylaniline) ("MDEA"); 4,4'-methylene-bis-(2,3-dichloroaniline) ("MDCA"); 4,4'-diamino-3,3'-diethyl-5,5'-dimethyl diphenylmethane; 2,2',3,3'-tetrachloro diamino diphenylmethane; trimethylene glycol di-p-aminobenzoate; and mixtures thereof. Preferably, the curing agent of the present invention includes 3,5-dimethylthio-2,4-toluenediamine and isomers thereof, such as ETHACURE®. 300, commercially available from Albermarle Corporation of Baton Rouge, La. Suitable polyamine curatives include both primary and secondary amines.

At least one of a diol, triol, tetraol, or hydroxy-terminated curatives may be added to the aforementioned polyurethane composition. Suitable diol, triol, and tetraol groups include ethylene glycol; diethylene glycol; polyethylene glycol; propylene glycol; polypropylene glycol; lower molecular weight polytetramethylene ether glycol; 1,3-bis(2-hydroxyethoxy) benzene; 1,3-bis-[2-(2-hydroxyethoxy)-ethoxy]benzene; 1,3-bis-{2-[2-(2-hydroxyethoxy)ethoxy]ethoxy}benzene; 1,4-butanediol; 1,5-pentanediol; 1,6-hexanediol; resorcinol-di-(.beta.-hydroxyethyl)ether; hydroquinone-di-(.beta.-hydroxyethyl)ether; and mixtures thereof. Preferred hydroxy-terminated curatives include 1,3-bis(2-hydroxyethoxy) benzene; 1,3-bis-[2-(2-hydroxyethoxy)ethoxy]benzene; 1,3-bis-{2-[2-(2-hydroxyethoxy)ethoxy]ethoxy}-benzene; 1,4-butanediol, and mixtures thereof.

Both the hydroxy-terminated and amine curatives can include one or more saturated, unsaturated, aromatic, and cyclic groups. Additionally, the hydroxy-terminated and amine curatives can include one or more halogen groups. The polyurethane composition can be formed with a blend or mixture of curing agents. If desired, however, the polyurethane composition may be formed with a single curing agent.

In a particularly preferred embodiment of the present invention, saturated (aliphatic) polyurethanes are used to form cover layers, preferably the outer cover layer. The thermoset polyurethanes may be castable, reaction injection moldable, sprayable, or applied in a laminate form or by any technical known in the art. The thermoplastic polyurethanes may be processed using any number of compression or injection techniques. In one embodiment, the saturated polyurethanes are substantially free of aromatic groups or moieties.

Saturated diisocyanates which can be used include, but are not limited to, ethylene diisocyanate; propylene-1,2-diisocyanate; tetramethylene-1,4-diisocyanate; 1,6-hexamethylene-diisocyanate; 2,2,4-trimethylhexamethylene diisocyanate; 2,4,4-trimethylhexamethylene diisocyanate; dodecane-1,12-diisocyanate; dicyclohexylmethane diisocyanate; cyclobutane-1,3-diisocyanate; cyclohexane-1,3-diisocyanate; cyclohexane-1,4-diisocyanate; 1-isocyanato-3,3,5-trimethyl-5-isocyanatomethylcyclohexane; isophorone diisocyanate ("IPDI"); methyl cyclohexylene diisocyanate; triisocyanate of HDI; triisocyanate of 2,2,4-trimethyl-1,6-hexane diisocyanate ("TMDI"). The most preferred saturated diisocyanates are 4,4'-dicyclohexylmethane diisocyanate and isophorone diisocyanate ("IPDI").

Saturated polyols which are appropriate for use in this invention include, but are not limited to, polyether polyols such as polytetramethylene ether glycol and poly(oxypropylene) glycol. Suitable saturated polyester polyols include polyethylene adipate glycol, polyethylene propylene adipate glycol, polybutylene adipate glycol, polycarbonate polyol and ethylene oxide-capped polyoxypropylene diols. Saturated polycaprolactone polyols which are useful in the invention include diethylene glycol initiated polycaprolactone, 1,4-butanediol initiated polycaprolactone, 1,6-hexanediol initiated polycaprolactone; trimethylol propane initiated polycaprolactone, neopentyl glycol initiated polycaprolactone, PTMEG-initiated polycaprolactone. The most preferred saturated polyols are PTMEG and PTMEG-initiated polycaprolactone.

Suitable saturated curatives include 1,4-butanediol, ethylene glycol, diethylene glycol, polytetramethylene ether glycol, propylene glycol; trimethanolpropane; tetra-(2-hydroxypropyl)-ethylenediamine; isomers and mixtures of isomers of cyclohexyldimethylol, isomers and mixtures of isomers of cyclohexane bis(methylamine); triisopropanolamine, ethylene diamine, diethylene triamine, triethylene tetramine, tetraethylene pentamine, 4,4'-dicyclohexylmethane diamine, 2,2,4-trimethyl-1,6-hexanediamine; 2,4,4-trimethyl-1,6-hexanediamine; diethyleneglycol di-(aminopropyl)ether; 4,4'-bis-(sec-butylamino)-dicyclohexylmethane; 1,2-bis-(sec-butylamino)cyclohexane; 1,4-bis-(sec-butylamino)cyclohexane; isophorone diamine, hexamethylene diamine, propylene diamine, 1-methyl-2,4-cyclohexyl diamine, 1-methyl-2,6-cyclohexyl diamine, 1,3-diaminopropane, dimethylamino propylamine, diethylamino propylamine, imido-bis-propylamine, isomers and mixtures of isomers of diaminocyclohexane, monoethanolamine, diethanolamine, triethanolamine, monoisopropanolamine, and diisopropanolamine. The most preferred saturated curatives are 1,4-butanediol, 1,4-cyclohexyldimethylol and 4,4'-bis-(sec -butylamino)-dicyclohexylmethane.

Suitable catalysts include, but are not limited to bismuth catalyst, oleic acid, triethylenediamine (DABCO®-33LV), di-butyltin dilaurate (DABCO®-T12) and acetic acid. The most preferred catalyst is di-butyltin dilaurate (DABCO®-T12). DABCO® materials are manufactured by Air Products and Chemicals, Inc.

It is well known in the art that if the saturated polyurethane materials are to be blended with other thermoplastics, care must be taken in the formulation process so as to produce an end product which is thermoplastic in nature. Thermoplastic materials may be blended with other thermoplastic materials, but thermosetting materials are difficult if not impossible to blend homogeneously after the thermosetting materials are formed. Preferably, the saturated polyurethane comprises from about 1 to about 100%, more preferably from about 10 to about 75% of the cover composition and/or the intermediate layer composition. About 10 to about 90%, more preferably from about 25 to about 90% of the cover and/or the intermediate layer composition is comprised of one or more other polymers and/or other materials as described below. Such polymers include, but are not limited to polyurethane/polyurea ionomers, polyurethanes or polyureas, epoxy resins, polyethylenes, polyamides and polyesters, polycarbonates and polyacrylin. Unless otherwise stated herein, all percentages are given in percent by weight of the total composition of the golf ball layer in question.

Polyurethane prepolymers are produced by combining at least one polyol, such as a polyether, polycaprolactone, polycarbonate or a polyester, and at least one isocyanate. Thermosetting polyurethanes are obtained by curing at least one polyurethane prepolymer with a curing agent selected from a polyamine, triol or tetraol. Thermoplastic polyurethanes are obtained by curing at least one polyurethane prepolymer with a diol curing agent. The choice of the curatives is critical because some urethane elastomers that are cured with a diol and/or blends of diols do not produce urethane elastomers with the impact resistance required in a golf ball cover. Blending the polyamine curatives with diol cured urethane elastomeric formulations leads to the production of thermoset urethanes with improved impact and cut resistance. Other suitable thermoplastic polyurethane resins include those disclosed in U.S. Pat. No. 6,235,830, which is incorporated herein, in its entirety, by express reference thereto.

The cores may be formed of conventional materials. The cores are substantially solid and form a center of a golf ball. The cores may also contain a liquid-, gas-, of gel-filled center. The cores of the present invention are surrounded by a single-layer or multiple-layer core or cover layers and are, optionally, painted, especially when a non-aliphatic or non-saturated polyurethane cover is employed. The balls may also include intermediate layers of molded or wound material as known by those of ordinary skill in the art. The present invention is therefore not limited to incorporating the cores into any particular golf ball construction and the present cores can be used in any constructions.

The materials for solid cores include compositions having a base rubber, a cross-linking agent, filler, and a co-cross-linking or initiator agent, and preferably, a halogenated organosulfur compound. The base rubber typically includes natural or synthetic rubbers. A preferred base rubber is 1,4-polybutadiene having a cis-structure of at least 40%, more preferably at least about 90%, and most preferably at least about 95%. Most preferably, the base rubber comprises high-Mooney-viscosity rubber. Preferably, the base rubber has a Mooney viscosity greater than about 35, more preferably greater than about 50. Preferably, the polybutadiene rubber has a molecular weight greater than about 400,000 and a polydispersity of no greater than about 2. Examples of desirable polybutadiene rubbers include BUNA® CB22 and BUNA® CB23, commercially available from Bayer of Akron, Ohio.; UBEPOL® 360L and UBEPOL® 150L, commercially available from UBE Industries of Tokyo, Japan; and CARIFLEX® BCP820 and CARIFLEX® BCP824, commercially available from Shell of Houston, Tex. If desired, the polybutadiene can also be mixed with other elastomers known in the art such as natural rubber, polyisoprene rubber and/or styrene-butadiene rubber in order to modify the properties of the core.

The cross-linking agent includes a metal salt, such as a zinc salt or a magnesium unsaturated fatty acid, such as acrylic or methacrylic acid, having 3 to 8 carbon atoms. Examples include, but are not limited to, one or more metal salt diacrylates, dimethacrylates, and monomethacrylates, wherein the metal is magnesium, calcium, zinc, aluminum, sodium, lithium, or nickel. Preferred acrylates include zinc acrylate, zinc diacrylate, zinc methacrylate, zinc dimethacrylate, and mixtures thereof. The cross-linking agent is typically present in an amount greater than about 10 parts per hundred ("pph") parts of the base polymer, preferably from about 20 to 40 pph of the base polymer, more preferably from about 25 to 35 pph of the base polymer.

The initiator agent can be any known polymerization initiator which decomposes during the cure cycle. Suitable initiators include organic peroxide compounds, such as dicumyl peroxide; 1,1-di(t-butylperoxy) 3,3,5-trimethyl cyclohexane; alpha.,.alpha.-bis(t-butylperoxy)diisopropylbenzene; 2,5-dimethyl-2,5 di(t-butylperoxy)hexane; di-t-butyl peroxide; and mixtures thereof. Other examples include, but are not limited to, VAROX® 231 XL and Varox® DCP-R, commercially available from Elf Atochem of Philadelphia, Pa.; PERKODOX® BC and PERKODOX® 14, commercially available from Akzo Nobel of Chicago, Ill.; and ELASTOCHEM® DCP-70, commercially available from Rhein Chemie of Trenton, N.J.

It is well known that peroxides are available in a variety of forms having different activity. The activity is typically defined by the "active oxygen content." For example, PERKODOX® BC peroxide is 98% active and has an active oxygen content of 5.80%, whereas PERKODOX® DCP-70 is 70% active and has an active oxygen content of 4.18%. If the peroxide is present in pure form, it is preferably present in an amount of at least about 0.25 pph, more preferably between about 0.35 pph and about 2.5 pph, and most preferably between about 0.5 pph and about 2 pph. Peroxides are also available in concentrate form, which are well-known to have differing activities, as described above. In this case, if concentrate peroxides are employed in the present invention, one skilled in the art would know that the concentrations suitable for pure peroxides are easily adjusted for concentrate peroxides by dividing by the activity. For example, 2 pph of a pure peroxide is equivalent (at the same percent active oxygen content) to 4 pph of a concentrate peroxide that is 50% active (i.e., 2 divided by 0.5=4).

Fillers typically include materials such as tungsten, zinc oxide, barium sulfate, silica, calcium carbonate, zinc carbonate, metals, metal oxides and salts, regrind (recycled core material typically ground to about 30 mesh particle), high-Mooney-viscosity rubber regrind, and the like. Fillers may be added to one or more portions of the golf ball and typically may include processing aids or compounds to affect rheological and mixing properties, density-modifying fillers, fillers to improve tear strength, or reinforcement fillers, and the like. The fillers are generally inorganic, and suitable fillers include numerous metals or metal oxides, such as zinc oxide and tin oxide, as well as barium sulfate, zinc sulfate, calcium carbonate, barium carbonate, clay, tungsten, tungsten carbide, an array of silicas, and mixtures thereof. Fillers may also include various foaming agents or blowing agents which may be readily selected by one of ordinary skill in the art. Fillers may include polymeric, ceramic, metal, and glass microspheres may be solid or hollow, and filled or unfilled. Fillers are typically also added to one or more portions of the golf ball to modify the density thereof to conform to uniform golf ball standards. Fillers may also be used to modify the weight of the center or at least one additional layer for specialty balls, e.g., a lower weight ball is preferred for a player having a low swing speed.

The invention also includes, if desired, a method to convert the cis-isomer of the polybutadiene resilient polymer component to the trans-isomer during a molding cycle and to form a golf ball. A variety of methods and materials suitable for cis-to-trans conversion have been disclosed in U.S. Pat. Nos. 6,162,135, 6,455,578, 6,291,592, and 6,458,895, each of which are incorporated herein, in their entirety, by reference.

The materials used in forming either the golf ball center or any portion of the core, in accordance with the invention, may be combined to form a mixture by any type of mixing known to one of ordinary skill in the art. Suitable types of mixing include single pass and multi-pass mixing. Suitable mixing equipment is well known to those of ordinary skill in the art, and such equipment may include a Banbury mixer, a two-roll mill, or a twin screw extruder.

Conventional mixing speeds for combining polymers are typically used. The mixing temperature depends upon the type of polymer components, and more importantly, on the type of free-radical initiator. Suitable mixing speeds and temperatures are well-known to those of ordinary skill in the art, or may be readily determined without undue experimentation.

The mixture can be subjected to, e.g., a compression or injection molding process, to obtain solid spheres for the center or hemispherical shells for forming an intermediate layer. The temperature and duration of the molding cycle are selected based upon reactivity of the mixture. The molding cycle may have a single step of molding the mixture at a single temperature for a fixed time duration. The molding cycle may also include a two-step process, in which the polymer mixture is held in the mold at an initial temperature for an initial duration of time, followed by holding at a second, typically higher temperature for a second duration of time. In a preferred embodiment of the current invention, a single-step cure cycle is employed. The materials used in forming either the golf ball center or any portion of the core, in accordance with the invention, may be combined to form a golf ball by an injection molding process, which is also well-known to one of ordinary skill in the art. Although the curing time depends on the various materials selected, those of ordinary skill in the art will be readily able to adjust the curing time upward or downward based on the particular materials used and the discussion herein.

The golf ball layers of the present invention can likewise include one or more homopolymeric or copolymeric materials, such as: (1) Vinyl resins, such as those formed by the polymerization of vinyl chloride, or by the copolymerization of vinyl chloride with vinyl acetate, acrylic esters or vinylidene chloride; (2) Polyolefins, such as polyethylene, polypropylene, polybutylene and copolymers such as ethylene methylacrylate, ethylene ethylacrylate, ethylene vinyl acetate, ethylene methacrylic or ethylene acrylic acid or propylene acrylic acid and copolymers and homopolymers produced using a single-site catalyst or a metallocene catalyst; (3) Polyurethanes, such as those prepared from polyols and diisocyanates or polyisocyanates and those disclosed in U.S. Pat. No. 5,334,673; (4) Polyureas, such as those disclosed in U.S. Pat. No. 5,484,870; (5) Polyamides, such as poly(hexamethylene adipamide) and others prepared from diamines and dibasic acids, as well as those from amino acids such as poly(caprolactam), and blends of polyamides with SURLYN®, polyethylene, ethylene copolymers, ethyl-propylene-non-conjugated diene terpolymer, and the like; (6) Acrylic resins and blends of these resins with poly vinyl chloride, elastomers, and the like; (7) Thermoplastics, such as urethanes; olefinic thermoplastic rubbers, such as blends of polyolefins with ethylene-propylene-non-conjugated diene terpolymer; block copolymers of styrene and butadiene, isoprene or ethylene-butylene rubber; or copoly(etheramide), such as PEBAX®, sold by ELF Atochem of Philadelphia, Pa.; (8) Polyphenylene oxide resins or blends of polyphenylene oxide with high impact polystyrene as sold under the trademark NORYL® by General Electric Company of Pittsfield, Mass.; (9) Thermoplastic polyesters, such as polyethylene terephthalate, polybutylene terephthalate, polyethylene terephthalate/glycol modified and elastomers sold under the trademarks HYTREL® by E.I. DuPont de Nemours & Co. of Wilmington, Del., and LOMOD® by General Electric Company of Pittsfield, Mass.; (10) Blends and alloys, including polycarbonate with acrylonitrile butadiene styrene, polybutylene terephthalate, polyethylene terephthalate, styrene maleic anhydride, polyethylene, elastomers, and the like, and polyvinyl chloride with acrylonitrile butadiene styrene or ethylene vinyl acetate or other elastomers; and (11) Blends of thermoplastic rubbers with polyethylene, propylene, polyacetal, nylon, polyesters, cellulose esters, and the like.

Any of the cover layers can include polymers, such as ethylene, propylene, butene-1 or hexene-1 based homopolymers or copolymers including functional monomers, such as acrylic and methacrylic acid and fully or partially neutralized ionomer resins and their blends, methyl acrylate, methyl methacrylate homopolymers and copolymers, imidized, amino group containing polymers, polycarbonate, reinforced polyamides, polyphenylene oxide, high impact polystyrene, polyether ketone, polysulfone, poly(phenylene sulfide), acrylonitrile-butadiene, acrylic-styrene -acrylonitrile, poly(ethylene terephthalate), poly(butylene terephthalate), poly(ethelyne vinyl alcohol), poly(tetrafluoroethylene) and their copolymers including functional co-monomers, and blends thereof. Suitable cover compositions also include a polyether or polyester thermoplastic urethane, a thermoset polyurethane, a low modulus ionomer, such as acid-containing ethylene copolymer ionomers, including E/X/Y terpolymers where E is ethylene, X is an acrylate or methacrylate-based softening comonomer present in about 0 to 50 weight percent and Y is acrylic or methacrylic acid present in about 5 to 35 weight percent. Preferably, the acrylic or methacrylic acid is present in about 8 to 35 weight percent, more preferably 8 to 25 weight percent, and most preferably 8 to 20 weight percent.

Any of the inner or outer cover layers may also be formed from polymers containing .alpha.,.beta.-unsaturated carboxylic acid groups, or the salts thereof, that have been 100 percent neutralized by organic fatty acids. The acid moieties of the highly-neutralized polymers ("HNP"), typically ethylene-based ionomers, are preferably neutralized greater than about 70%, more preferably greater than about 90%, and most preferably at least about 100%. The HNP's can be also be blended with a second polymer component, which, if containing an acid group, may be neutralized in a conventional manner, by the organic fatty acids of the present invention, or both. The second polymer component, which may be partially or fully neutralized, preferably comprises ionomeric copolymers and terpolymers, ionomer precursors, thermoplastics, polyamides, polycarbonates, polyesters, polyurethanes, polyureas, thermoplastic elastomers, polybutadiene rubber, balata, metallocene-catalyzed polymers (grafted and non-grafted), single-site polymers, high-crystalline acid polymers, cationic ionomers, and the like.

The acid copolymers can be described as E/X/Y copolymers where E is ethylene, X is an .alpha.,.beta.-ethylenically unsaturated carboxylic acid, and Y is a softening comonomer. In a preferred embodiment, X is acrylic or methacrylic acid and Y is a $C_{1-8}$ alkyl acrylate or methacrylate ester. X is preferably present in an amount from about 1 to about 35 weight percent of the polymer, more preferably from about 5 to about 30 weight percent of the polymer, and most preferably from about 10 to about 20 weight percent of the polymer. Y is preferably present in an amount from about 0 to about 50 weight percent of the polymer, more preferably from about 5 to about 25 weight percent of the polymer, and most preferably from about 10 to about 20 weight percent of the polymer.

The organic acids are aliphatic, mono-functional (saturated, unsaturated, or multi-unsaturated) organic acids. Salts of these organic acids may also be employed. The salts of organic acids of the present invention include the salts of barium, lithium, sodium, zinc, bismuth, chromium, cobalt, copper, potassium, strontium, titanium, tungsten, magnesium, cesium, iron, nickel, silver, aluminum, tin, or calcium, salts of fatty acids, particularly stearic, erucic, oleic, linoelic or dimerized derivatives thereof. It is preferred that the organic acids and salts of the present invention be relatively non-migratory (they do not bloom to the surface of the polymer under ambient temperatures) and non-volatile (they do not volatilize at temperatures required for melt-blending).

Thermoplastic polymer components, such as copolyetheresters, copolyesteresters, copolyetheramides, elastomeric polyolefins, styrene diene block copolymers and their hydrogenated derivatives, copolyesteramides, thermoplastic polyurethanes, such as copolyetherurethanes, copolyesterurethanes, copolyureaurethanes, epoxy-based polyurethanes, polycaprolactone-based polyurethanes, polyureas, and polycarbonate-based polyurethanes fillers, and other ingredients, if included, can be blended in either before, during, or after the acid moieties are neutralized, thermoplastic polyurethanes.

A variety of conventional components can be added to the cover compositions of the present invention. These include, but are not limited to, white pigment such as $TiO_2$, ZnO, optical brighteners, surfactants, processing aids, foaming agents, density-controlling fillers, UV stabilizers and light stabilizers. Saturated polyurethanes are resistant to discoloration, however, they are not immune to deterioration in their mechanical properties upon weathering. Addition of UV absorbers and light stabilizers to any of the above compositions and, in particular, the polyurethane compositions, help to maintain the tensile strength, elongation, and color stability. Suitable UV absorbers and light stabilizers include TINUVIN®328, TINUVIN® 213, TINUVIN® 765, TINUVIN® 770 and TINUVIN® 622. The preferred UV absorber is TINUVIN® 328, and the preferred light stabilizer is TINUVIN® 765. TINUVIN® products are available from Ciba-Geigy. Dyes, as well as optical brighteners and fluorescent pigments may also be included in the golf ball covers produced with polymers formed according to the present invention. Such additional ingredients may be added in any amounts that will achieve their desired purpose.

Any method known to one of ordinary skill in the art may be used to polyurethanes of the present invention. One commonly employed method, known in the art as a one-shot method, involves concurrent mixing of the polyisocyanate, polyol, and curing agent. This method results in a mixture that is inhomogenous (more random) and affords the manufacturer less control over the molecular structure of the resultant composition. A preferred method of mixing is known as a prepolymer method. In this method, the polyisocyanate and the polyol are mixed separately prior to addition of the curing agent. This method affords a more homogeneous mixture resulting in a more consistent polymer composition. Other methods suitable for forming the layers of the present invention include reaction injection molding ("RIM"), liquid injection molding ("LIM"), and pre-reacting the components to form an injection moldable thermoplastic polyurethane and then injection molding, all of which are known to one of ordinary skill in the art.

It has been found by the present invention that the use of a castable, reactive material, which is applied in a fluid form, makes it possible to obtain very thin outer cover layers on golf balls. Specifically, it has been found that castable, reactive liquids, which react to form a urethane elastomer material, provide desirable very thin outer cover layers.

The castable, reactive liquid employed to form the urethane elastomer material can be applied over the core using a variety of application techniques such as spraying, dipping, spin coating, or flow coating methods which are well known in the art. An example of a suitable coating technique is that which is disclosed in U.S. Pat. No. 5,733,428, the disclosure of which is hereby incorporated by reference in its entirety in the present application.

The outer cover layer is preferably formed around the inner cover layer by mixing and introducing the material in the mold halves. It is important that the viscosity be measured over time, so that the subsequent steps of filling each mold half, introducing the core into one half and closing the mold can be properly timed for accomplishing centering of the core cover halves fusion and achieving overall uniformity. Suitable viscosity range of the curing urethane mix for introducing cores into the mold halves is determined to be approximately between about 2,000 cP and about 30,000 cP, with the preferred range of about 8,000 cP to about 15,000 cP.

To start the cover formation, mixing of the pre-polymer and curative is accomplished in motorized mixer including mixing head by feeding through lines metered amounts of curative and pre-polymer. Top preheated mold halves are filled and placed in fixture units using centering pins moving into holes in each mold. At a later time, a bottom mold-half or a series of bottom mold halves have similar mixture amounts introduced into the cavity. After the reacting materials have resided in top mold halves for about 40 to about 80 seconds, a core is lowered at a controlled speed into the gelling reacting mixture.

In one embodiment of this invention, allylic halide moiety in the polymer composition is neutralized by reacting with a nucleophile such as trimethylamine, triethylamine, triisopropylamine, triphenylamine, trimethyl phosphine, triethyl phosphine, triphenyl phosphine, or triisoprylphosphine etc. to produce a partially or fully neutralized butyl ionomer.

In another embodiment of the invention, the acid moiety in the butyl polymer composition is neutralized first with a metal cation, such as barium, lithium, sodium, zinc, bismuth, chromium, cobalt, copper, potassium, strontium, titanium, tungsten, magnesium, cesium, iron, nickel, silver, aluminum, tin, calcium, manganese and mixtures thereof, before blending with a fatty acid or a salt of a fatty acid such as barium, lithium, sodium, zinc, bismuth, chromium, cobalt, copper, potassium, strontium, titanium, tungsten, magnesium, cesium, iron, nickel, silver, aluminum, tin, calcium, and manganese, as well as mixtures thereof. In another embodiment, the nucleophile or the metal cation, the fatty acid, or salt thereof, are present in an amount sufficient to neutralize the allylic halide or acid moiety in the polymer, by at least about 80%. In another embodiment, the nucleophile or the metal cation, the fatty acid or salt thereof are present in an amount sufficient to neutralize the ionomers by about 90 to about 100%. In another embodiment, nucleophile or the metal cation, the fatty acid or salt thereof are present in an amount sufficient to neutralize the allylic halide or acid moiety in the polymer by about 100%.

In another embodiment of this invention, the polymer compositions are neutralized using a suitable nucleophile or cation source in the presence of a salt of a fatty acid, such as barium, lithium, sodium, zinc, bismuth, chromium, cobalt, copper, potassium, strontium, titanium, tungsten, magnesium, cesium, iron, nickel, silver, aluminum, tin, calcium, and manganese, as well as mixtures thereof. In one embodiment, the salt of the fatty acid is present in an amount sufficient to neutralize the ionomers by at least about 80%. In another embodiment, the salt of the fatty acid is present in an amount sufficient to neutralize the ionomers by about 90 to about 100%. In another embodiment, the salt of the fatty acid is present in an amount sufficient to neutralize the allylic halide or acid moiety in the polymer by about 100%.

In another embodiment, the allylic halide or acid moiety in the polymer compositions are neutralized by a mixture of the process of (a) using a suitable nucleophile or metal cation, before blending with a fatty acid or salt thereof, and (b) using only a salt of a fatty acid. In this embodiment, a suitable nucleophile or metal cation, and fatty acid or salt thereof are present in an amount sufficient to neutralize the allylic halide or acid moiety in the polymer by at least about 80%. In another embodiment, a suitable nucleophile or cation, and the fatty acid or salt thereof are present in an amount sufficient to neutralize the allylic halide or acid moiety in the polymer by about 90 to about 100%. In another embodiment, a suitable nucleophile or cation, and the fatty acid, or salt thereof are present in an amount sufficient to neutralize the ionomers by about 100%.

The butyl rubber polymer is not limited to a special isoolefin. However, isoolefins within the range of from 4 to 16 carbon atoms, preferably 4-7 carbon atoms, such as isobutene, 2-methyl-i-butene, 3-methyl-i-butene, 2-methyl-2-butene, 4-methyl-1-pentene and mixtures thereof are preferred. More preferred is isobutylene.

The butyl rubber polymer is not limited to a special multi-olefin monomer. Every multiolefin co-polymerizable with the isoolefin known by the skilled in the art can be used. However, multiolefins with in the range of from 4-14 carbon atoms, such as isoprene, butadiene, 2-methylbutadiene, 2,4-dimethylbutadiene, piperyline, 3-methyl-1,3-pentadiene, 2,4-hexadiene, 2-neopentylbutadiene, 2-methyl-1,5-hexadiene, 2,5-dimethyl-2,4-hexadiene, 2-methyl-1,4-pentadiene, 2-methyl-1,6-heptadiene, cyclopenta-diene, methylcyclopentadiene, cyclohexadiene, 1-vinyl-cyclohexadiene and mixtures thereof, preferably conjugated dienes, are used. Isoprene is more preferably used.

As optional monomers, any monomer copolymerizable with the isoolefins and/or dienes known by the skilled in the art can be used. .alpha.-methyl styrene, p-methyl styrene, chlorostyrene, cyclopentadiene and methylcyclopentadiene are preferably used. Indene and other styrene derivatives may also be used. beta.-pinene can also be used as a co-monomer for the isoolefin.

In one embodiment, the butyl rubber ionomer is prepared from a high multiolefin butyl rubber polymer. The preparation of a suitable high multiolefin butyl rubber polymer is described in pending application CA 2,418,884, which is incorporated herein by reference. The reaction mixture used to produce the high multiolefin containing butyl polymer further contains a multiolefin cross-linking agent. The term cross-linking agent is known to those skilled in the art and is understood to denote a compound that causes chemical cross-linking between the polymer chains in opposition to a monomer that will add to the chain. Some easy preliminary tests will reveal if a compound will act as a monomer or a cross-linking agent. The choice of the cross-linking agent is not restricted. Preferably, the cross-linking contains a multi-olefinic hydrocarbon compound. Examples of these include norbornadiene, 2-isopropenylnorbornene, 2-vinyl-norbornene, 1,3,5-hexatriene, 2-phenyl-1,3-butadiene, divinyl-benzene, diisopropenylbenzene, divinyltoluene, divinylxylene and $C_1$ to $C_{20}$ alkyl-substituted derivatives thereof. More preferably, the multiolefin crosslinking agent is divinyl-benzene, diiso-propenylbenzene, divinyltoluene, divinyl-xylene and $C_1$ to $C_{20}$ alkyl substituted derivatives thereof, and or mixtures of the compounds given. Most preferably the multiolefin crosslinking agent contains divinylbenzene and diisopropenylbenzene.

Preferably, the monomer mixture used to prepare the high multiolefin butyl polymer contains in the range of from 80% to 96% by weight of at least one isoolefin monomer and in the range of from 3.0% to 20% by weight of at least one multi-olefin monomer and/or .beta.-pinene and in the range of from 0.01% to 1% by weight of at least one multiolefin cross-linking agent. More preferably, the monomer mixture contains in the range of from 83% to 94% by weight of at least one isoolefin monomer and in the range of from 5.0% to 17% by weight of a multiolefin monomer or .beta.-pinene and in the range of from 0.01% to 1% by weight of at least one multi-olefin cross-linking agent. Most preferably, the monomer mixture contains in the range of from 85% to 93% by weight of at least one isoolefin monomer and in the range of from 6.0% to 15% by weight of at least one multiolefin monomer, including .beta.-pinene and in the range of from 0.01% to 1% by weight of at least one multiolefin cross-linking agent.

The weight average molecular weight of the high multiolefin butyl polymer (Mw), is preferably greater than 240 kg/mol, more preferably greater than 300 kg/mol, even more preferably greater than 500 kg/mol, most preferably greater than 600 kg/mol. The gel content of the high multiolefin butyl polymer is preferably less than 5 wt. %, more preferably less than 3 wt. %, even more preferably less than 1 wt. %, most preferably less than 0.5 wt. %. In connection with the present invention the term "gel" is understood to denote a fraction of the polymer insoluble for 60 min in cyclohexane boiling under reflux.

A regular butyl polymer contains at least 0.5 mol %, preferably at least 0.75 mol %, more preferably at least 1.0 mol %, yet more preferably at least 1.5 mol %, still more preferably at least 2.0 mol %, even more preferably at least 2.5 mol % of repeating units derived from at least one multiolefin monomer. A high multiolefin butyl polymer contains at least 3.0 mol %, preferably at least 4.0 mol %, more preferably at least 5.0 mol %, yet more preferably at least 6.0 mol %, still more preferably at least 7.0 mol % of repeating units derived from at least one allylic halide monomer.

The regular butyl polymer or high multiolefin butyl polymer can then be subjected to a halogenation process in order to produce a halobutyl polymer. Bromination or chlorination can be performed according to the process known by those skilled in the art, for example, the procedures described in Rubber Technology, 3rd Ed., Edited by Maurice Morton, Kluwer Academic Publishers, pp. 297-300 and further documents cited therein. A further example is provided in a co-pending application by Resendes, et al., entitled "Method of Halogenating Butyl Rubber Without Acid Neutralization Agents", which is incorporated herein by reference.

During halogenation, some or all of the multiolefin content of the butyl polymer is converted to allylic halides. The allylic halides in the halobutyl polymer are therefore repeating units derived from the multiolefin monomers originally present in the butyl polymer. Of course, there may be residual multiolefin content in the halobutyl polymer and there may then be both allylic halides and non-halogenated multiolefins present within the same polymer. However, the total allylic halide content of the halobutyl polymer cannot exceed the starting multiolefin content of the parent butyl polymer. For example, a halobutyl polymer having 0.5 mol % of allylic halides would also, by definition, have at least 0.5 mol % of repeating units derived from the multiolefin monomer, and could very well have residual multiolefin content, especially when high multiolefin butyl polymers are used as the starting material for the halobutyl polymer. Accordingly, in the present invention halobutyl polymers contain at least 0.5 mol %, more preferably at least 0.75 mol %, yet more preferably at least 1.0 mol %, even more preferably at least 1.5 mol % of allylic halides and/or repeating units derived from allylic halides and may contain residual multiolefins.

The halobutyl polymer can be reacted with at least one nitrogen and/or phosphorus containing nucleophile according to the following formula,

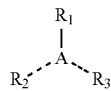

wherein: A is a nitrogen or phosphorus; and, $R_1$, $R_2$ and $R_3$ are selected from the group consisting of linear or branched $C_1$-$C_{18}$ alkyl substituents, an aryl substituent which is monocyclic or composed of fused $C_4$-$C_8$ rings, and/or a hetero atom selected from, for example, B, N, O, Si, P, and S.

In general, the appropriate nucleophile will contain at least one neutral nitrogen or phosphorus center which possesses a lone pair of electrons which is both electronically and sterically accessible for participation in nucleophilic substitution reactions. Suitable nucleophiles include trimethylamine, triethylamine, triisopropylamine, tri-n-butylamine, trimethylphosphine, triethylphosphine, triisopropylphosphine, tri-n-butylphosphine, and triphenylphosphine.

The amount of nucleophile reacted with the butyl rubber may be in the range from 1 to 5 molar equivalents, more preferably 1.5 to 4 molar equivalents and even more preferably 2 to 3 molar equivalents based on the total molar amount of allylic halide present in the halobutyl polymer.

The halobutyl polymer and the nucleophile can be reacted for about 10 to 90 minutes, preferably from 15 to 60 minutes and more preferably from 20 to 30 minutes at temperatures ranging from 80 to 200° C., preferably from 90 to 160° C. and more preferably from 100 to 140° C.

Since the nucleophile reacts with the allylic halide functionality of the halobutyl polymer, the resulting ionomeric moiety is a repeating unit derived from an allylic halide. The total content of ionomeric moiety in the butyl ionomer therefore cannot exceed the starting amount of allylic halide in the halobutyl polymer; however, residual allylic halides and/or residual multiolefins may be present. The resulting halobutyl based ionomer preferably possesses at least 0.5 mol %, preferably at least 0.75 mol %, more preferably at least 1.0 mol %, yet more prefereably at least 1.5 mol % of the ionomeric moiety. Residual allylic halides may be present in an amount of from 0.1 mol % up to an amount not exceeding the original allylic halide content of the halobutyl polymer used to produce the butyl ionomer. Residual multiolefin may be present in an amount of from 0.1 mol % up to an amount not exceeding the original multiolefin content of the butyl polymer used to produce the halobutyl polymer. Typically, the residual multiolefin content of the ionomer is from 0.1 to 6 mol %, preferably from 0.2 to 5 mol %, more preferably from 0.3 to 4 mol %, yet more preferably from 0.4 to 3 mol %, even more preferably from 0.5 to 2 mol %, still more preferably from 0.7 to 1.5 mol %, especially when the butyl ionomer is based upon a high multiolefin butyl polymer.

When high multiolefin content halobutyl rubber is used to prepare the butyl rubber ionomer, the ionomer may have at least 1.5 mol % residual multiolefin monomer, preferably isoprene. Preferably, the butyl rubber ionomer prepared from high multiolefin halobutyl rubber has at least 3.5 mol % residual 1,4 isoprene. The butyl rubber ionomer made from high multiolefin halobutyl rubber exhibits may improve resiliency and performance of the golf ball.

In a preferred embodiment, the ionomer may contain in the range of 0.1 to 5.0 phr of an organic fatty acid, preferably an unsaturated fatty acid having one, two or more carbon double bonds in the molecule, which more preferably includes 10% by weight or more of a conjugated diene acid having at least one conjugated carbon-carbon double bond in its molecule. Preferably those fatty acids have in the range of from 8-22 carbon atoms, more preferably 12-18. Examples include stearic acid, palmic acid and oleic acid and their calcium-, zinc-, magnesium-, potassium-, sodium- and ammonium salts.

Cured articles can also be made from the butyl rubber ionomer and/or the composite material. Preferably, the articles are peroxide cured. In curing the ionomer, there are many suitable peroxide curing agents that may be used, for example, dicumyl peroxide, di-tert.-butyl peroxide, benzoyl peroxide, 2,2'-bis tert.-butylperoxy diisopropylbenzene (Vulcup® 40KE), benzoyl peroxide, 2,5-dimethyl-2,5-di(tert-butylperoxy)-hexyne-3,2,5-dimethyl-2,5-di(benzoy-lperoxy) hexane, (2,5-bis(tert.-butylperoxy)-2,5-dimethyl hexane and the like. The best suited curing agents are readily ascertained by means of a few preliminary experiments. A preferred peroxide curing agent comprising dicumyl peroxide is commercially available under the trademark DiCup™ 40C. The peroxide curing agent is suitably used in an amount of 0.2 to 10 parts per hundred parts of rubber (phr), preferably 1 to 6 phr, more preferably about 4 phr.

Vulcanizing co-agents known to be suitable by those skilled in the art can also be used. Mention is made of triallyl isocyanurate (TAIC), commercially available under the trademark DIAK 7 from DuPont or N,N'-m-phenylene dimaleimide known as HVA-2.TM. (DuPont Dow), triallyl cyanurate (TAC) or liquid polybutadiene known as Ricon® D 153 (supplied by Ricon Resins). Amounts can be equivalent to the peroxide curative or less.

An antioxidant may also be included in the ionomer, suitably in an amount up to 4 phr, preferably about 2 phr. Examples of suitable antioxidants include p-dicumyl diphenylamine (Naugard® 445), Vulkanox® DDA (a diphenylamine derivative), Vulkanox® ZMB2 (zinc salt of methylmercapto benzimidazole), Vulkanox® HS (polymerized 1,2-dihydro-2,2,4-trimethyl quinoline) and Irganox® 1035 (thiodiethylene bis(3,5-di-tert.-butyl-4-hydroxy) hydrocinnamate or thiodiethylene bis(3-(3,5-di-tert.-butyl-4-hydroxyphenyl)propionate supplied by Ciba-Geigy. Vulkanox is a trademark of Lanxess Inc.

The HNP-containing compositions of the present invention include one or more highly neutralized acid polymer(s) and one or more polyhydric alcohol(s). By the present invention, it has been found that by adding a sufficient amount of a polyhydric alcohol to compositions containing an acid polymer, the acid groups of the acid polymer can be neutralized at high levels, including up to 100%, without requiring a fatty acid to maintain processability.

The HNP-containing compositions may contain fatty acids and salts thereof, but are processable without them. Fatty acids include, for example, caproic acid, caprylic acid, capric acid, lauric acid, stearic acid, behenic acid, erucic acid, oleic acid, and linoleic acid. Preferably, the HNP-containing composition is substantially free of fatty acids and their salts. However, fatty acids and salts thereof may be used in the HNP-containing composition without departing from the spirit of the invention. "Substantially free," as used herein, means that the composition does not contain fatty acids or their salts, or includes fatty acids or their salts in an amount of less than 0.5 wt %, based on the total polymeric weight of the composition.

The present invention is directed to highly-neutralized polymers and blends thereof ("HNP") for the use in golf equipment, preferably in ball cores, intermediate layers, and/or covers. The acid moieties of the HNP's, typically ethylene-based ionomers, are preferably neutralized greater than about 70%, more preferably greater than about 90%, and most preferably at least about 100%. The HNP's can be also be blended with a second polymer component, which, if containing an acid group, may be neutralized in a conventional manner, by the organic fatty acids of the present invention, or both. The second polymer component, which may be partially or fully neutralized, preferably comprises ionomeric copolymers and terpolymers, ionomer precursors, thermoplastics, polyamides, polycarbonates, polyesters, polyurethanes, polyureas, thermoplastic elastomers, polybutadiene rubber, balata, metallocene-catalyzed polymers (grafted and non-grafted), single-site polymers, high-crystalline acid polymers, cationic ionomers, and the like HNP polymers typically have a material hardness of between about 20 and about 80 Shore D, and a flexural modulus of between about 3,000 psi and about 200,000 psi.

In one embodiment of the present invention the HNP's are ionomers and/or their acid precursors that are preferably neutralized, either filly or partially, with organic acid copolymers or the salts thereof. The acid copolymers are preferably .alpha.-olefin, such as ethylene, $C_{3-8}$ .alpha.,.beta.-ethylenically unsaturated carboxylic acid, such as acrylic and methacrylic acid, copolymers. They may optionally contain a softening monomer, such as alkyl acrylate and alkyl methacrylate, wherein the alkyl groups have from 1 to 8 carbon atoms.

The cured article may contain further auxiliary products for rubbers, such as reaction accelerators, vulcanizing accelerators, vulcanizing acceleration auxiliaries, antioxidants, foaming agents, anti-aging agents, heat stabilizers, light stabilizers, ozone stabilizers, processing aids, plasticizers, tackifiers, blowing agents, dyestuffs, pigments, waxes, extenders, organic acids, inhibitors, metal oxides, and activators such as triethanolamine, polyethylene glycol, hexanetriol, etc., which are known to the rubber industry. The rubber aids are used in conventional amounts that depend, inter alia, on the intended use. The cured article may also contain mineral and/or non-mineral fillers. Conventional amounts are from 0.1 to 50 wt. %, based on rubber.

Mineral fillers according to the present invention are composed of particles of a mineral; suitable fillers include silica, silicates, clay (such as bentonite and Montmorillonite nano clays), organophilicly modified clays, gypsum, alumina, titanium dioxide, talc and the like, as well as mixtures thereof.

Further examples of suitable mineral fillers include: highly dispersible silicas, prepared e.g. by the precipitation of silicate solutions or the flame hydrolysis of silicon halides, with specific surface areas of 5 to 1000, preferably 20 to 400 m.sup.2/g (BET specific surface area), and with primary particle sizes of 10 to 400 nm; the silicas can optionally also be present as mixed oxides with other metal oxides such as Al, Mg, Ca, Ba, Zn, Zr and Ti; synthetic silicates, such as aluminum silicate and alkaline earth metal silicate; magnesium silicate or calcium silicate, with BET specific surface areas of 20 to 400 m.sup.2/g and primary particle diameters of 10 to 400 nm; natural silicates, such as kaolin and other naturally occurring silicates and clays; glass fibers and glass fiber products (matting, extrudates) or glass microspheres; metal oxides, such as zinc oxide, calcium oxide, magnesium oxide and aluminum oxide; metal carbonates, such as magnesium carbonate, calcium carbonate and zinc carbonate; and, metal hydroxides, e.g. aluminum hydroxide and magnesium hydroxide or combinations thereof.

Because these mineral particles have hydroxyl groups on their surface, rendering them hydrophilic and oleophobic, it is difficult to achieve good interaction between the filler particles and the butyl elastomer. If desired, the interaction between the filler particles and the polymer can be enhanced by the introduction of silica modifiers. Non-limiting examples of such modifiers include bis-[-(triethoxysilyl)-propyl]-tetrasulfide, bis-[-(triethoxysilyl)-proply]-disulfide, N,N,-dimethylethanolamine, ethanolamine, triethoxysilyl-propyl-thiol and triethoxyvinylsilane.

For many purposes, the preferred mineral is silica, especially silica prepared by the carbon dioxide precipitation of sodium silicate.

Dried amorphous silica particles suitable for use as mineral fillers in accordance with the present invention have a mean agglomerate particle size in the range of from 1 to 100 microns, preferably between 10 and 50 microns and more preferably between 10 and 25 microns. It is preferred that less than 10 percent by volume of the agglomerate particles are below 5 microns or over 50 microns in size. A suitable amorphous dried silica has a BET surface area, measured in accordance with DIN (Deutsche Industrie Norm) 66131, of between 50 and 450 square meters per gram and a DBP absorption, as measured in accordance with DIN 53601, of between 150 and 400 grams per 100 grams of silica, and a drying loss, as measured according to DIN ISO 787/11, of from 0 to 10 percent by weight. Suitable silica fillers are commercially available under the trademarks HiSil 210, HiSil 233 and HiSil 243 available from PPG Industries Inc. Also suitable are Vulkasil S™ and Vulkasil N™, commercially available from Lanxess Inc.

Mineral fillers can also be used in combination with known non-mineral fillers, such as: carbon blacks—suitable carbon blacks are preferably prepared by the lamp black, furnace black or gas black process and have BET specific surface areas of 20 to 200 m.sup.2/g, for example, SAF, ISAF, HAF, FEF or GPF carbon blacks; and/or, rubber gels, preferably those based on polybutadiene, butadiene/styrene copolymers, butadiene/acrylonitrile copolymers and polychloroprene.

In some embodiments, non-mineral fillers may be present in an amount up to 40 phr. It is preferred that the mineral filler should constitute at least 55% by weight of the total amount of filler.

The compounding and vulcanization may be carried out by a process known to those skilled in the art, such as the process disclosed in Encyclopedia of Polymer Science and Engineering, Vol. 4, S.66 et seq. (Compounding) and Vol. 17, S. 666 et seq. (Vulcanization).

The invention is further illustrated with reference to the following examples.

EXAMPLES

Example 1

Preparation of IIR Containing 6.5 mol % of Isoprene

The following example illustrates the continuous production of a novel grade of IIR possessing an isoprene content of up to 8.0 mol % and Mooney viscosity (ML 1+8@125.degree° C.) between 35 and 40 MU.

The monomer feed composition was comprised of 4.40 wt. % of isoprene (IP or IC5) and 25.7 wt. % of isobutene (IP or IC4). This mixed feed was introduced into the continuous polymerization reactor at a rate of 5900 kg/hour. In addition, DVB was introduced into the reactor at a rate of 5.4 to 6 kg/hour. Polymerization was initiated via the introduction of an $AlCl_3$/MeCl solution (0.23 wt. % of $AlCl_3$ in MeCl) at a rate of 204 to 227 kg/hour. The internal temperature of the continuous reaction was maintained between −95 and −100° C. through the use of an evaporative cooling process. Following sufficient residence time within the reactor, the newly formed polymer crumb was separated from the MeCl diluent with the use of an aqueous flash tank. At this point, ca. 1 wt. % of Stearic acid was introduced into the polymer crumb. Prior to drying, 0.1 wt. % of the stabilizer Irganox® 1010 was added to the polymer. Drying of the resulting material was accomplished with the use of a conveyor oven. The resulting material was found to contain 6.5 mol % of isoprene by $_1H$ NMR analysis.

Example 2

Preparation of High Isoprene BIIR

To a solution of 7 kg of Example 1 in 31.8 kg of hexanes and 2.31 kg of water in a 95 L reactor was added with rapid agitation 110 mL of elemental bromine. After 5 minutes, the reaction was terminated via the addition of a caustic solution comprised of 76 g of NaOH in 1 L of water. Following an additional 10 minutes of agitation, a stabilizer solution comprised of 21.0 g of epoxidized soya-bean oil and 0.25 g of Irganox 1076 in 500 mL of hexanes and one comprised of 47.0 g of epoxidized soya-bean oil and 105 g of calcium stearate in 500 mL of hexanes was added to the reaction mixture. After an additional 1 h of agitation, the high IP BIIR was isolated by steam coagulation. The final material was dried to a constant weight with the use of a two roll 10".times.20" mill operating at 100° C. The microstructure of the resulting material of Example 2 Total Unsats (mol %) 5.79 1,4 Isoprene (mol %) 4.19 Branched Isoprene (mol %) 0.32 Allylic Bromide (mol %) 0.71 Conjugated Diene (mol %) 0.04 Endo Br (mol %) 0.07.

Example 3

Preparation of IIR Ionomer 48 g of BB2030 and 4.7 g (3 molar equivalents based on allylic bromide content of Example 1) of triphenylphosphine were added to Brabender internal mixer (Capacity 75 g) operating at 100° C. and a rotor speed of 60 RPM. Mixing was carried out for a total of 60 minutes. Analysis of the final product by $_1H$ NMR confirmed the complete conversion of all the allylic bromide of Example 1 to the corresponding ionomeric species. The resulting material was also found to possess 0.4 mol % of residual 1,4-IP.

Example 4

Preparation of High Isoprene IIR Ionomer 48 g of Example 2 and 4.7 g (3 molar equivalents based on allylic bromide content of Example 1) of triphenylphosphine were added to Brabender internal mixer (Capacity 75 g) operating at 100° C. and a rotor speed of 60 RPM. Mixing was carried out for a total of 60 minutes. Analysis of the final product by $_1H$ NMR confirmed the complete conversion of all the allylic bromide of Example 2 to the corresponding ionomeric species. The resulting material was also found to possess 4.20 mol % of residual 1,4-IP.

Golf balls made from the above processes result in golf balls typically having a coefficient of restitution of greater than about 0.7, preferably greater than about 0.75, and more preferably greater than about 0.78. The golf balls also typically have an Atti compression of at least about 30, preferably from about 50 to 120, and more preferably from about 60 to 100.

When golf balls are prepared according to the invention, they typically will have dimple coverage greater than about 60 percent, preferably greater than about 65 percent, and more preferably greater than about 75 percent. The flexural modulus of the cover material used on the golf balls, as measured by ASTM method D6272 98. Procedure B, is typically greater than about 10 kpsi, and is preferably from about 10 kpsi to 150 kpsi, more preferably 15 to 70 kpsi. As discussed herein, the outer cover layer is preferably formed from a relatively soft polyurethane or polyurea material. In particular, the material of the outer cover layer should have a material hardness, as measured by ASTM-D2240, less than about 70 Shore D, more preferably between about 25 and about 50 Shore D, and most preferably between about 40 and about 48 Shore D. The inner cover layer preferably has a material hardness of less than about 70 Shore D, more preferably between about 20 and about 70 Shore D, and most preferably, between about 40 and about 65 Shore D.

The core of the present invention has an Atti compression of less than about 120, more preferably, between about 20 and about 100, and most preferably, between about 40 and about 90. In an alternative, low compression embodiment, the core has an Atti compression less than about 20. The Shore C surface hardness of the core is preferably less than 100 and more preferably less than 90.

The overall outer diameter ("OD") of the core is less than about 1.650 inches, preferably, no greater than 1.620 inches, more preferably between about 1.000 and about 1.510 inches, and most preferably between about 1.510 inches to about 1.61 inches. The OD of the inner cover layer is preferably between 1.580 inches and about 1.650 inches, more preferably between about 1.590 inches to about 1.630 inches, and most preferably between about 1.600 inches to about 1.630 inches.

The core of the golf ball may also be extremely large in relation to the rest of the ball. For example, in one embodiment, the core makes up about 90 percent to about 98 percent of the ball, preferably about 94 percent to about 96 percent of the ball. In this embodiment, the diameter of the core is preferably about 1.54 inches or greater, preferably about 1.55 inches or greater. In one embodiment, the core diameter is about 1.59 inches or greater. In another embodiment, the diameter of the core is about 1.64 inches or less.

When the core includes an inner core layer and an outer core layer, the inner core layer is preferably about 0.9 inches or greater and the outer core layer preferably has a thickness of about 0.1 inches or greater. In one embodiment, the inner core layer has a diameter from about 0.09 inches to about 1.2 inches and the outer core layer has a thickness from about 0.1 inches to about 0.8 inches. In yet another embodiment, the inner core layer diameter is from about 0.095 inches to about 1.1 inches and the outer core layer has a thickness of about 0.20 inches to about 0.03 inches.

The cover typically has a thickness to provide sufficient strength, good performance characteristics, and durability. The thickness of the outer cover layer may be from about 0.005 inches to about 0.100 inches, preferably about 0.007 inches to about 0.035 inches. In one embodiment, the cover thickness is from about 0.02 inches to about 0.35 inches. In another embodiment, the cover preferably has a thickness of about 0.02 inches to about 0.12 inches, preferably about 0.1 inches or less, more preferably about 0.07 inches or less. In yet another embodiment, the outer cover has a thickness from about 0.02 inches to about 0.07 inches. In still another embodiment, the cover thickness is about 0.05 inches or less, preferably from about 0.02 inches to about 0.05 inches. For example, the outer cover layer may be between about 0.02 inches and about 0.045 inches, preferably about 0.025 inches to about 0.04 inches thick. In one embodiment, the outer cover layer is about 0.03 inches thick.

The range of thicknesses for an inner cover layer of a golf ball is large because of the vast possibilities when using an inner cover layer, i.e., as an outer core layer, a wound layer, a moisture/vapor barrier layer. When used in a golf ball of the invention, the inner cover layer may have a thickness about 0.3 inches or less. In one embodiment, the thickness of the inner cover layer is from about 0.002 inches to about 0.1 inches, preferably about 0.01 inches or greater. In one embodiment, the thickness of the inner cover layer is about 0.09 inches or less, preferably about 0.06 inches or less. In another embodiment, the inner cover layer thickness is about 0.05 inches or less, more preferably about 0.01 inches to about 0.045 inches. In one embodiment, the inner cover layer, thickness is about 0.02 inches to about 0.04 inches. In another embodiment, the inner cover layer thickness is from about 0.025 inches to about 0.035 inches. In yet another embodiment, the thickness of the inner cover layer is about 0.035 inches thick. In still another embodiment, the inner cover layer is from about 0.03 inches to about 0.035 inches thick. Varying combinations of these ranges of thickness for the inner and outer cover layers may be used in combination with other embodiments described herein.

The ratio of the thickness of the inner cover layer to the outer cover layer is preferably about 10 or less, preferably from about 3 or less. In another embodiment, the ratio of the thickness of the intermediate layer to the outer cover layer is about 1 or less.

Accordingly, it is preferable that the golf balls of the present invention have an inner cover layer with a flexural modulus of about 500 psi to about 500,000 psi according to ASTM D-6272-98. More preferably, the flexural modulus of the inner cover layer is about 1,000 psi to about 250,000 psi. Most preferably, the flexural modulus of the inner cover layer is about 2,000 psi to about 200,000 psi. The flexural modulus of the cover layer is preferably about 2,000 psi or greater, and more preferably about 5,000 psi or greater. In one embodiment, the flexural modulus of the cover is from about 10,000 psi to about 150,000 psi. More preferably, the flexural modulus of the cover layer is about 15,000 psi to about 120,000 psi. Most preferably, the flexural modulus of the cover layer is about 18,000 psi to about 110,000 psi. In another embodiment, the flexural modulus of the cover layer is about 100,000 psi or less, preferably about 80,000 or less, and more preferably about 70,000 psi or less. For example, the flexural modulus of the cover layer may be from about 10,000 psi to about 70,000 psi, from about 12,000 psi to about 60,000 psi, or from about 14,000 psi to about 50,000 psi.

In one embodiment, when the cover has a hardness of about 50 Shore D to about 65 Shore D, the cover layer preferably has a flexural modulus of about 55,000 psi to about 70,000 psi.

In one embodiment, the ratio of the flexural modulus of the inner cover layer to the outer cover layer is about 0.003 to about 50. In another embodiment, the ratio of the flexural modulus of the inner cover layer to the outer cover layer is about 0.006 to about 4.5. In yet another embodiment, the ratio of the flexural modulus of the inner cover layer to the outer cover layer is about 0.11 to about 4.5.

In one embodiment, the compositions of the invention are used in a golf ball with multiple cover layers having essentially the same hardness, but differences in flexural moduli. In this aspect of the invention, the difference between the flexural moduli of the two cover layers is preferably about 5,000 psi or less. In another embodiment, the difference in flexural moduli is about 500 psi or greater. In yet another embodiment, the difference in the flexural moduli between the two cover layers, wherein at least one is reinforced is about 500 psi to about 10,000 psi, preferably from about 500 psi to about 5,000 psi. In one embodiment, the difference in flexural moduli between the two cover layers formed of unreinforced or unmodified materials is about 1,000 psi to about 2,500 psi.

The specific gravity of an outer cover or inner cover layer is preferably at least about 0.7. In one embodiment, the specific gravity of the inner layer or outer cover layer is about 0.8 or greater, preferably about 0.9 or greater. For example, in one embodiment, the golf ball has an inner layer with a specific gravity of about 0.9 or greater and an outer layer having a specific gravity of about 0.95 or greater. In another embodiment, the inner layer has a specific gravity of about 1.00 or greater. In yet another embodiment, the specific gravity of the inner layer or outer cover layer is about 1.05 or greater, preferably about 1.10 or greater. In still another embodiment, the specific gravity of the inner layer or outer cover layer is about 1.3.

The core may have a specific gravity of about 1.00 or greater, preferably 1.05 or greater. For example, a golf ball of the invention may have a core with a specific gravity of about 1.10 or greater and a cover with a specific gravity of about 0.95 or greater.

Although the United States Golf Association ("USGA") specifications limit the minimum size of a competition golf ball to 1.680 inches. There is no specification as to the maximum diameter. Golf balls of any size, however, can be used for recreational play. The preferred diameter of the present golf balls is from about 1.680 inches to about 1.800 inches. The more preferred diameter is from about 1.680 inches to about 1.760 inches. The most preferred diameter is about 1.680 inches to about 1.740 inches.

It should be understood, especially to one of ordinary skill in the art, that there is a fundamental difference between "material hardness" and "hardness, as measured directly on a golf ball." Material hardness is defined by the procedure set forth in ASTM-D2240 and generally involves measuring the hardness of a flat "slab" or "button" formed of the material of which the hardness is to be measured. Hardness, when measured directly on a golf ball (or other spherical surface) is a completely different measurement and, therefore, results in a different hardness value. This difference results from a number of factors including, but not limited to, ball construction (i.e., core type, number of core and/or cover layers, etc.), ball (or sphere) diameter, and the material composition of adjacent layers. It should also be understood that the two measurement techniques are not linearly related and, therefore, one hardness value cannot easily be correlated to the other.

As used herein, the term "about," used in connection with one or more numbers or numerical ranges, should be understood to refer to all such numbers, including all numbers in a range.

The invention described and claimed herein is not to be limited in scope by the specific embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

What is claimed is:

1. A golf ball comprising:
   a core comprising a center and a layer disposed about the center; and
   a cover disposed about the core,
   wherein the cover and either the center or the layer is formed from a composition comprising a partially or fully neutralized butyl ionomer;
   the butyl ionomer comprises: repeating units derived from at least one isoolefin monomer; at least 0.5 mol % of repeating units derived from at least one multiolefin monomer, at least 0.5 mol % of repeating units derived from an allylic halide; and at least 0.5 mol % of an ionomeric moiety; and
   wherein the isoolefin comprises isobutylene, the multiolefin comprises isoprene and the allylic halide comprises a bromide.

2. The golf ball of claim 1, wherein the center comprises a thermoplastic material, a thermoset material, or a rubber-based material.

3. The golf ball of claim 1, wherein the cover comprises either an ionomer, a polyurethane or a polyurea.

4. The golf ball of claim 1, wherein the cover further comprises at least two layers, and wherein at least one of the layers comprises the composition.

5. The golf ball of claim 1, wherein the cover layer comprises a thickness of 0.01 inches to 0.05 inches and a Shore D hardness of 40 to 65.

6. The golf ball of claim 1, wherein the partially neutralized butyl ionomer is formed by reacting an allylic halide moiety with a sufficient amount of a suitable nucleophile.

7. The golf ball of claim 1, wherein the fully neutralized butyl ionomer is formed by reacting an allylic halide moiety with a suitable nucleophile in the presence of a sufficient amount of an organic fatty acid salt.

8. The golf ball of claim 6, wherein the nucleophile is selected from a group consisting of trimethyl amine, triethyl amine, triphenylamine, trimethyl phosphine, triethyl phoshine and triphenyl phosphine.

9. The golf ball according to claim 7, wherein the organic fatty acid salt is selected from a group consisting of butyric acid, caproic acid, caprylic acid, capric acid, lauric acid, myristic acid, palmitic acid, margaric acid, stearic acid, arachidic acid, behenic acid, lignoceric acid, palmitoleic acid, petroselinic acid, oleic acid, elaidic acid, cis-vaccenic acid, trans-vaccenic acid, gadoleic acid, gondoic acid, erucic acid, nervonic acid, linoleic acid, .gamma.-linolenic acid, .alpha.-linolenic acid, stearidonic acid, dihomo-.gamma. -linolenic acid, arachidonic acid, timnodonic acid, clupandonic acid, dimers, trimers and mixtures thereof.

10. The golf ball of claim 1, wherein the core has an outer diameter of 1.50 inches to 1.62 inches.

* * * * *